(12) United States Patent
Park

(10) Patent No.: US 9,215,179 B2
(45) Date of Patent: Dec. 15, 2015

(54) SDN-BASED NETWORK SHARING METHOD AND APPARATUS FOR SUPPORTING MULTIPLE OPERATORS

(71) Applicant: Samsung Electronics Co., Ltd., Gyeonggi-do (KR)

(72) Inventor: Ki-Beom Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 89 days.

(21) Appl. No.: 14/180,738

(22) Filed: Feb. 14, 2014

(65) Prior Publication Data
US 2014/0226467 A1    Aug. 14, 2014

(30) Foreign Application Priority Data

Feb. 14, 2013  (KR) .................. 10-2013-0015593

(51) Int. Cl.
*H04L 12/70* (2013.01)
*G06F 15/16* (2006.01)
*H04L 12/857* (2013.01)
*H04L 12/24* (2006.01)

(52) U.S. Cl.
CPC ........ *H04L 47/2491* (2013.01); *H04L 41/0806* (2013.01)

(58) Field of Classification Search
USPC .............. 370/229, 238, 255; 709/224, 235
See application file for complete search history.

(56) References Cited

U.S. PATENT DOCUMENTS

| | | | |
|---|---|---|---|
| 2011/0261825 A1 | 10/2011 | Ichino | |
| 2011/0317701 A1 | 12/2011 | Yamato et al. | |
| 2012/0020361 A1 | 1/2012 | Ueno | |
| 2012/0226801 A1* | 9/2012 | Velaga et al. | 709/224 |
| 2012/0259960 A1 | 10/2012 | Sharma et al. | |
| 2012/0260232 A1 | 10/2012 | Hirsch et al. | |
| 2012/0303835 A1* | 11/2012 | Kempf et al. | 709/235 |
| 2013/0250770 A1* | 9/2013 | Zou et al. | 370/238 |

FOREIGN PATENT DOCUMENTS

| | | |
|---|---|---|
| WO | WO 2012/126488 | 9/2012 |
| WO | WO 2013/008134 | 1/2013 |

* cited by examiner

*Primary Examiner* — Edan Orgad
*Assistant Examiner* — Sithu Ko
(74) *Attorney, Agent, or Firm* — The Farrell Law Firm, P.C.

(57) ABSTRACT

A method for performing Software Defined Network (SDN)-based network sharing by a controller to support multiple operators is provided. The method includes configuring a plurality of flow tables in which an independent packet processing operation policy is defined per operator; and transmitting the plurality of configured flow tables to a network equipment, to establish an independent packet processing operation policy per operator in the network equipment.

30 Claims, 10 Drawing Sheets

SDN-BASED NETWORK SHARING METHOD AND APPARATUS FOR SUPPORTING MULTIPLE OPERATORS

PRIORITY

This application claims priority under 35 U.S.C. §119(a) to a Korean Patent Application filed in the Korean Intellectual Property Office on Feb. 14, 2013 and assigned Serial No. 10-2013-0015593, the entire disclosure of which is incorporated herein by reference.

BACKGROUND

1. Field of the Invention

The present invention relates generally to a Software Defined Network (SDN)-based network sharing method and apparatus for supporting multiple operators, and more particularly, to an SDN-based network sharing method and apparatus for supporting multiple operators to operate a network equipment shared by multiple operators in an easy and optimized way.

2. Description of the Related Art

The recent network has been operated in a combined complex network structure of an existing wired network and a wireless network. Due to the increasing number of users that use the next-generation mobile communication system, such as Long Term Evolution (LTE), the network traffic has increased exponentially.

In this complex network structure, due to the rapid increase in the number of users using the next-generation mobile communication such as LTE, an operator desiring to newly build a network needs to share resources of the network equipments operated by the mobile network operators. Therefore, there is a need for a technique in which multiple operators operate in common using the resources of the network equipments.

In recent years, a new method is being widely used, in which different operators share the same network resources in order to optimize the installation, operation and maintenance costs in the network, or to minimize the Operation EXpense (OPEX) and CApital EXpenditures (CAPEX).

FIGS. 1A and 1B illustrate, respectively, a common mobile communication network in which network resources are not shared, and a common mobile communication network in which network resources are shared. In FIGS. 1A and 1B, mobile communication networks that are considered, which are used in the LTE mobile communication system, include Evolved Universal Terrestrial Radio Access Networks (eUTRANs) each comprised of evolved Node Bs (eNBs).

Specifically, FIG. 1A illustrates one eNB that is connected to a core network (or an Evolved packet core A) of one network operator (or an operator A). Therefore, the mobile communication network in FIG. 1A corresponds to a case where network resources are not shared.

FIG. 1B illustrates an example in which a core network (or an Evolved packet core A) of one network operator (or an operator A) and a core network (or an Evolved packet core B) of another network operator (or an operator B) share in common an eNB constituting an eUTRAN. This network sharing may occur in common both in a mobile communication network and a wired network.

FIGS. 2A and 2B illustrate examples of network sharing presented in the mobile communication standard such as the 3$^{rd}$ Generation Partnership Project (3GPP). Specifically, FIG. 2A illustrates network sharing in a Multiple Operator Core Network (MOCN), and FIG. 2B illustrates network sharing in a Gateway Core Network (GWCN).

Referring to FIG. 2A, in the MOCN, which is one of the 3GPP mobile communication standards, a core network (or an Evolved packet core A) of one network operator (or an operator A) and a core network (or an Evolved packet core B) of another network operator (or an operator B) share in common an eNB of an eUTRAN through an S1 interface.

Referring to FIG. 2B, in the GWCN, a core network (or an Evolved packet core A) of one network operator (or an operator A) and a core network (or an Evolved packet core B) of another network operator (or an operator B) share in common three Mobile Management Entities (MMEs) connected to an S1 interface, and share in common an eNB of an eUTRAN through the three MMEs.

As illustrated in FIGS. 2A and 2B, in the mobile communication standard such as 3GPP, a variety of network sharing including eUTRAN sharing are under discussion and have been implemented based on the MOCN, the GWCN and the like.

A technique for sharing resources of a radio link and a technique for sharing resources of a backhaul link, which is an upper connection link, with a relevant equipment are important in order to actually implement the network sharing technique proposed in the above mobile communication standard.

Basically, these resource sharing techniques may be equally applied not only to the wireless network, but also to existing wired network equipments such as switches, routers and the like.

The core of the technique for sharing resources of one network equipment by multiple operators is a network virtualization technique for distributing physical resources, such as network interfaces, as logical resources.

The network virtualization technique may include a Virtual Local Area Network (VLAN)-based network virtualization technique, a virtual router-based network virtualization technique, a Multi-Protocol Label Switching (MPLS)-based network virtualization technique, and the like.

The VLAN-based network virtualization technique, which is a technique that can be most easily implemented, is a technique for distributing physical network resources to a logical area that is based on a VLAN-ID for a Layer 2 (L2) packet.

The virtual router-based network virtualization technique is a technique for configuring a plurality of virtual routers by separating information of a Layer 3 (L3) routing table based on a virtual router ID, which is an ID of a virtualization area.

The MPLS-based network virtualization technique is a technique for virtualizing a network between an existing L2 header and an L3 header using a logical MPLS label. To this end, all network equipments managed by the operator need to support the complex MPLS functions.

The VLAN-based network sharing method may be most simply applied. However, it is difficult to establish network sharing over the whole network, using a VLAN which is an L2 network. Further, it is not easy to implement various additional functions including traffic engineering such as per-operator resource optimization. In addition, when network resources are operated by being linked to Internet Protocol (IP) addresses, each per-operator allocable IP address pool and a VLAN ID associated with an operator ID need to be managed by being mapped to each other.

The virtual router-based network sharing method is a method of operating virtual routers per multiple operators of each equipment. Since this method is valid only in a specific network equipment that has set up a virtual routing domain, it is difficult to transparently manage the network. In other words, when multiple equipments are operated in addition to two peers, to which a virtual router is applied, it is difficult to operate network sharing with a unified policy in the network.

The MPLS-based network sharing method is advantageous in that this method can transparently manage the network with a consistent policy in the whole network domain, based on a MPLS label-based tunneling technique, and can perform various additional functions such as fast restoration, traffic engineering and the like, provided by MPLS. However, MPLS is difficult to implement due to its high complexity, and many parts of its control plane and data plane need to be changed. In addition, in order to operate MPLS, each network equipment needs a lot of resources.

Therefore, a scenario of separating and operating the network based on MPLS to support multiple operators has many advantages, but has limitations of having high complexity and requiring a lot of resources.

In addition to the above-described network virtualization techniques, the requirements for the next-generation network additionally need to take into account priority between operators and need to provide Quality of Service (QoS) or security per flow, when multiple operators share network resources.

Moreover, multiple operators each need to operate the network using its management system, but actually it is difficult to provide this function. In addition, mobile virtual network operators need to set the network equipment through an Element Management System (EMS) of the mobile network operators.

The most serious problem is that when multiple operators share resources of one network equipment, it is very difficult to easily set the network equipment, expand the network equipment, and manage the network.

The existing network virtualization techniques basically need to set each network equipment individually. Therefore, the maintenance of each equipment is very difficult. In particular, it is difficult to apply the policy taking into account the states of many equipments managed by the network operator.

Another problem in the case where multiple operators share resources of one network equipment is the establishment of a QoS policy.

The network sharing technique basically causes competition between multiple operators, for the common resources. If congestion occurs in the network, Hierarchical QoS (H-QoS) handling related to consideration of priority between multiple operators is needed in addition to the existing QoS policy.

In other words, in the network sharing technique supporting multiple operators, processing of the hierarchical operation for multiple operators needs to be fully considered for the processing methods such as classification, marking, policing, shaping, scheduling and the like, which are the traditional QoS processing components.

SUMMARY

An aspect of the present disclosure is to address at least the above-mentioned problems and/or disadvantages and to provide at least the advantages described below. Accordingly, an aspect of the present invention is to provide a Software Defined Network (SDN)-based network sharing method and apparatus for supporting multiple operators with a simple structure using minimum resources.

In accordance with an aspect of the present invention, there is provided a method for performing SDN-based network sharing by a controller to support multiple operators. The method includes configuring a plurality of flow tables in which an independent packet processing operation policy is defined per operator; and transmitting the plurality of configured flow tables to a network equipment, to establish an independent packet processing operation policy per operator in the network equipment.

In accordance with another aspect of the present invention, there is provided a method for performing SDN-based network sharing by a network equipment to support multiple operators. The method includes receiving a plurality of flow tables, in which an independent packet processing operation policy is defined per operator, from a controller; and establishing an independent packet processing operation policy per operator according to the plurality of received flow tables.

In accordance with another aspect of the present invention, there is provided an apparatus for performing SDN-based network sharing by a controller to support multiple operators. The apparatus includes a configuring unit for configuring a plurality of flow tables in which an independent packet processing operation policy is defined per operator; and a transmitter for transmitting the plurality of configured flow tables to a network equipment, to establish an independent packet processing operation policy per operator in the network equipment.

In accordance with another aspect of the present invention, there is provided an apparatus for performing SDN-based network sharing by a network equipment to support multiple operators. The apparatus includes a receiver for receiving a plurality of flow tables, in which an independent packet processing operation policy is defined per operator, from a controller; and a configuring unit for establishing an independent packet processing operation policy per operator according to the plurality of received flow tables.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of the embodiments of the invention as defined by the claims and their equivalents. It includes various specific details to assist in that understanding but these are to be regarded as mere examples. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their dictionary meanings, but, are merely used to enable a clear and consistent understanding of the invention. Accordingly, it should be apparent to those skilled in the art that the following description of embodiments of the present invention is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the following description, the most innovative and advanced network sharing method will be described in detail below. Particularly, in the present invention, a simple way to utilize a Software Defined Network (SDN) in order to allow multiple operators to share network resources with minimum resources will be described in detail below.

Further, a traffic engineering method for determining a per-operator optimized path using the SDN-based network sharing method provided in the present invention will be described in detail below.

In addition, a method for providing per-operator Hierarchical Quality of Service (H-QoS) using the SDN-based network sharing method provided in the present invention will be described in detail below.

Prior to a detailed description of embodiments of the present invention, the basic structure and concepts of the SDN will be described in detail with reference to FIG. 3, for a better understanding of the present invention.

Figure 1A:
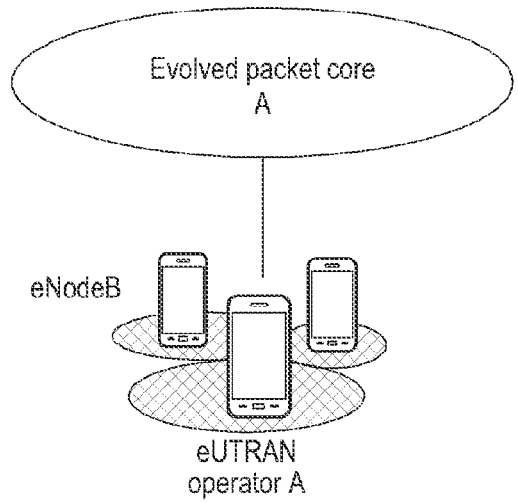
FIGS. 1A and 1B illustrate, respectively, a common mobile communication network in which network resources are not shared, and a common mobile communication network in which network resources are shared.
Figure 1B:
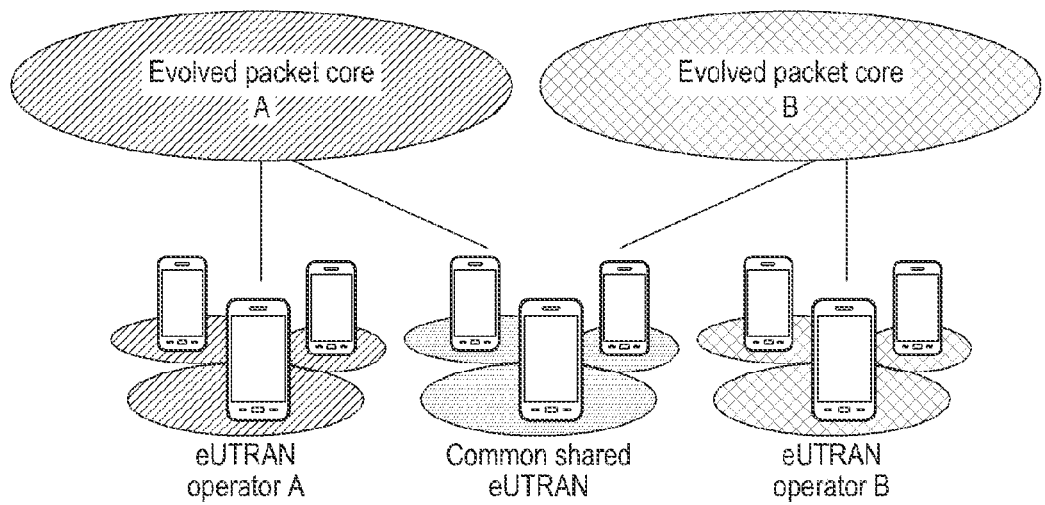
Figure 2A:
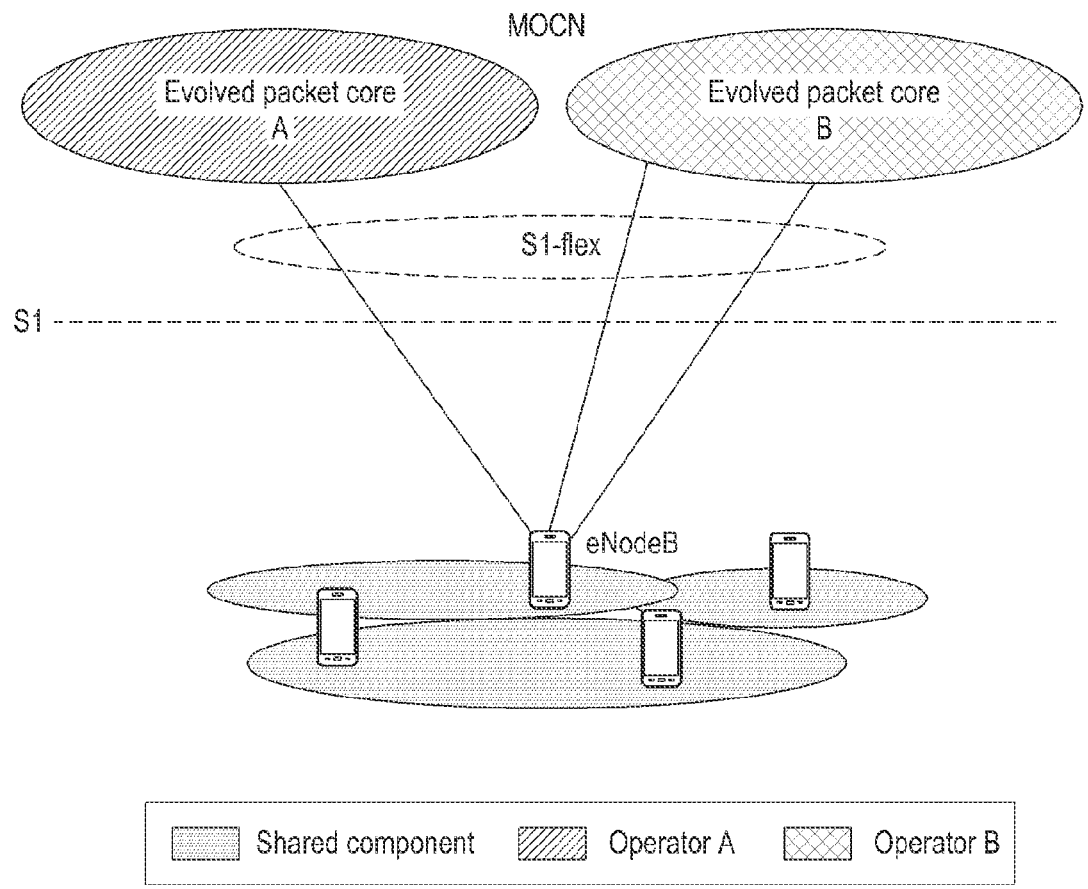
FIGS. 2A and 2B illustrate examples of network sharing presented in the mobile communication standard such as $3^{rd}$ Generation Partnership Project (3GPP)
Figure 2B:
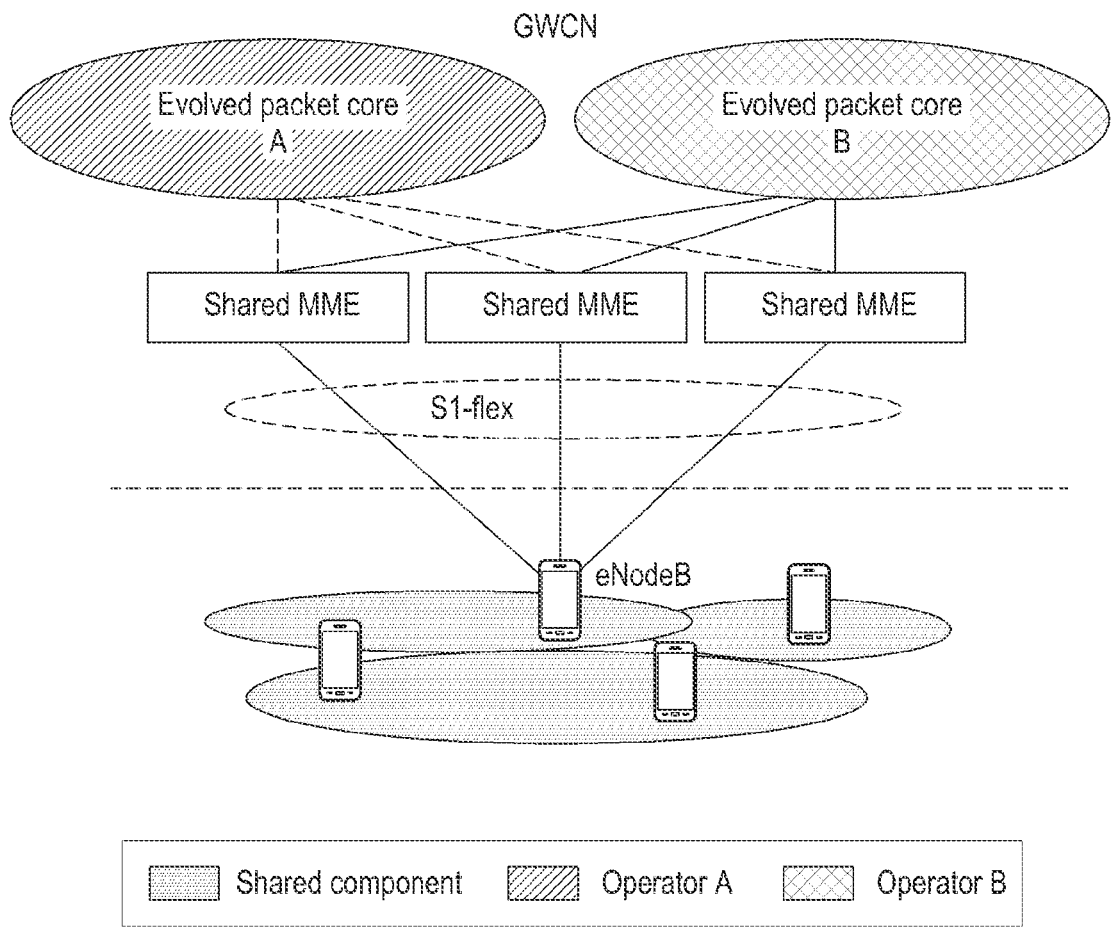
Figure 3:
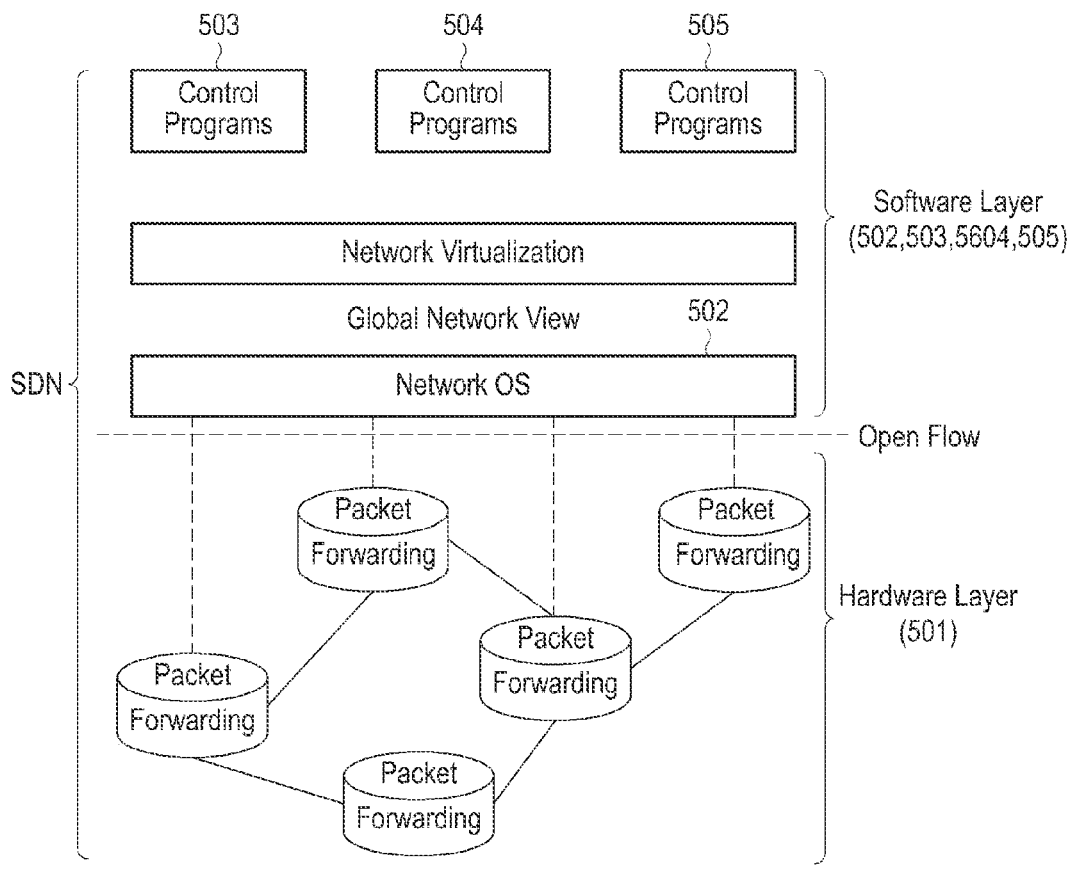
FIG. 3 illustrates the basic structure of a Software Defined Network (SDN) that is applied to the present invention.

FIG. 3 illustrates the basic structure of a Software Defined Network (SDN) that is applied to the present invention.

The SDN technique may be construed as a technique in which a controller performs the control operation related to packet processing that the existing hardware-type network equipment performs by itself. The controller may be defined as a platform that is provided in the form of software capable of easily managing and controlling the entire network by programming the control operation. This SDN technique may be described as the SDN structure illustrated in FIG. 3.

Referring to FIG. 3, a hardware layer 501 for performing a packet forwarding function is located in the bottom layer, and software layers 502, 503, 504 and 505 corresponding to the controller are located in an upper layer of the hardware layer 501. The hardware layer 501 may include network equipments such as mobile communication base stations, base station controllers, gateway equipments, and a wired network's switches and routers. The software layers may include a network Operating System (OS) 502, and control programs 503, 504 and 505. This SDN structure is similar to a computer system comprised of hardware, OS and application programs. That is, the network may be likened to the computer system.

In order to solve various problems of the existing network, a need for the SDN technique is required. The standardization and commercialization of various network platforms having the above SDN structure are under active discussion. OpenFlow has been provided as the standard for commercializing the network platforms having the SDN structure.

OpenFlow may be defined as a type of interface that connects the hardware layer 501 for providing the packet forwarding function to the network OS 502, as illustrated in FIG. 3. For example, the control programs 503, 504 and 505 may be connected to the hardware layer 501 through OpenFlow (or an OpenFlow protocol), which will now be described in detail.

Most Ethernet switches and routers have a flow table, which is needed to collect statistical information, or to implement a firewall, Network Access Translation (NAT), and QoS at a line speed. The flow table may be different for each equipment, but may have common characteristics. OpenFlow uses these attributes. OpenFlow may easily program flow tables of the heterogeneous switches and routers according to the open protocol, regardless of the equipment manufacturer and the type of equipment.

Figure 4:
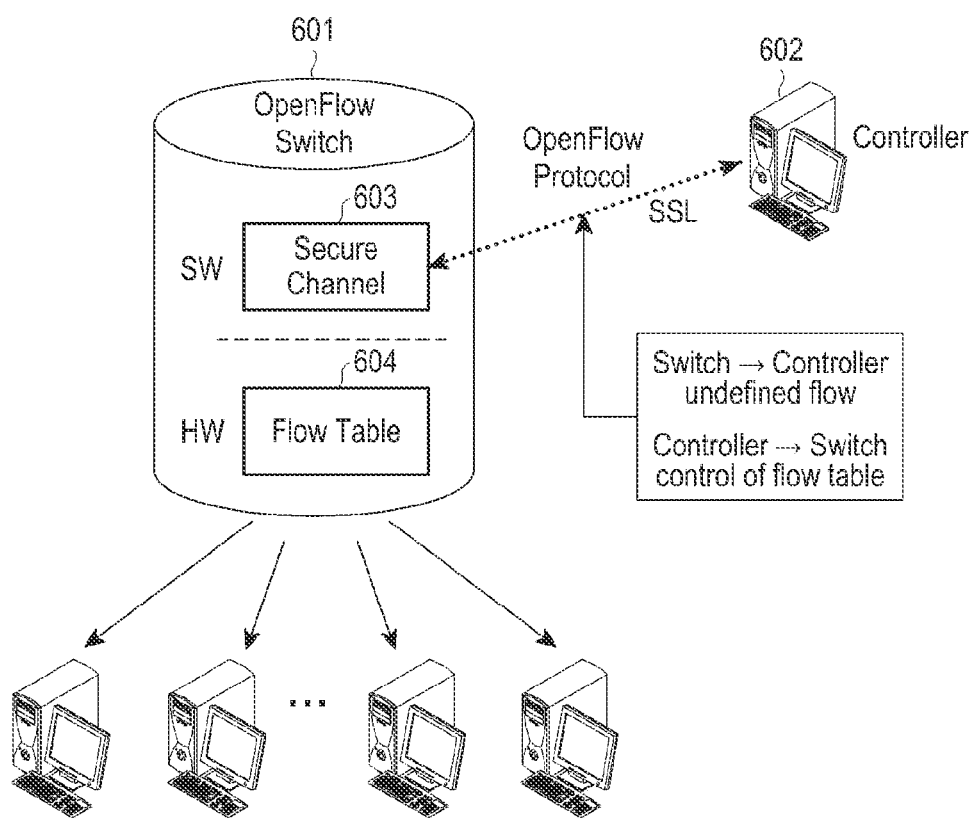
FIG. 4 illustrates the OpenFlow system structure that is applied to the present invention.

FIG. 4 illustrates the OpenFlow system structure that is applied to the present invention.

Referring to FIG. 4, the OpenFlow structure includes an OpenFlow switch 601 for processing a packet of the network, and a controller 602 for managing the OpenFlow switch 601. Although one OpenFlow switch 601 is illustrated in FIG. 4, multiple OpenFlow switches may be provided in the network in reality. The controller 602 may manage the multiple OpenFlow switches in a centralized way.

The OpenFlow switch 601 and the controller 602 may be interconnected by the OpenFlow protocol. In other words, the controller 602 and the OpenFlow switch 601 may exchange information with each other through the standardized OpenFlow protocol.

The OpenFlow switch 601 includes a software layer SW and a hardware layer HW, and the software layer SW handles the protocol of exchanging information with the controller 602 through a secure channel 603. The secure channel 603 is a communication channel between the OpenFlow switch 601 and the controller 602 located in a remote place, and may be delivered by being encrypted, since the secure channel 603 carries important information used to control the OpenFlow switch 601. The hardware layer HW has a flow table 604 that includes action and statistical information which is processed inside the OpenFlow switch 601 per flow. As for the flow (or packet flow), if a terminal is assumed to transmit data to a destination using multiple packets, the multiple packets are transmitted to the same destination through the same path. The flow may be defined as a flow of the packets which are transmitted to the same destination.

Figure 5:
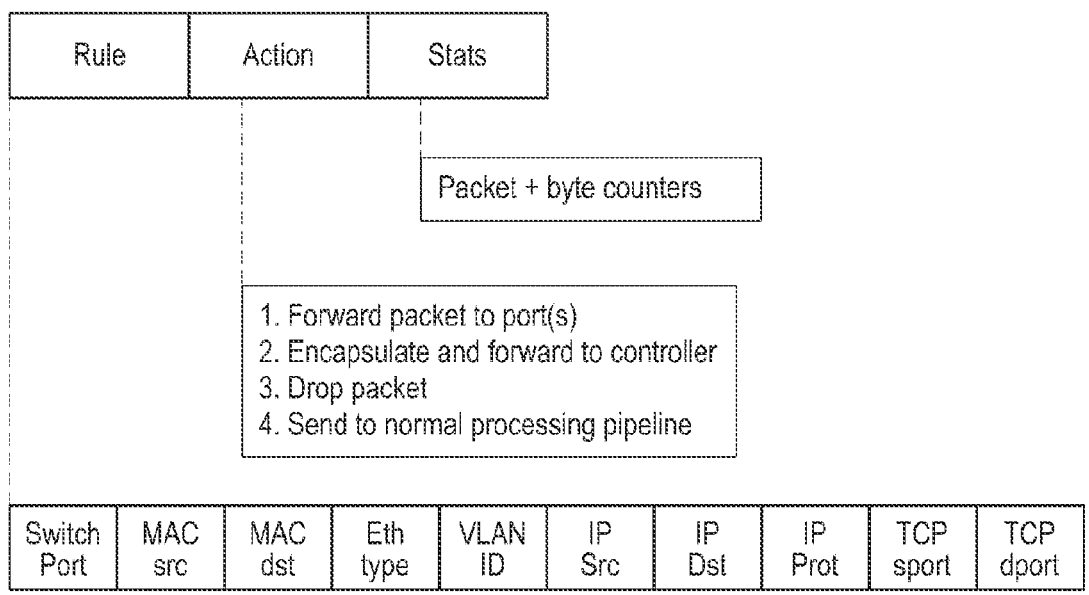
FIG. 5 illustrates a structure of a flow table applied to the present invention.

FIG. 5 illustrates a structure of a flow table applied to the present invention.

Referring to FIG. 5, the flow table 604 includes three kinds of key information used to process the packet received at the switch, and the three kinds of key information include packet header information 'Rule' defining a flow, action information 'Action' indicating how to process a packet, and per-flow statistics 'Stats'.

The OpenFlow protocol is an open protocol for communication between the OpenFlow switch 601 and the controller 602. The controller 602 may include a function of configuring the flow table 604 inside the OpenFlow switch 601, and registering or deleting a new flow.

Referring back to FIG. 4, the OpenFlow switch 601 distinguishes a received packet depending on the flow, processes the packet according to the packet processing operation policy defined in the flow table 604, and then forwards the packet to a destination port. The flow may be defined based on a Transmission Control Protocol (TCP) connection, a specific Media Access Control (MAC) or Internet Protocol (IP) address, and a packet having the same VLAN value.

The received packet may be distinguished per flow, and processed in any one of the following three basic operations.

1—A received packet may be forwarded to an agreed port that is defined in a flow table. This may perform a function in which a packet is forwarded to a destination over the network.

2—The received packet may be forwarded to the controller 602 located outside, over a secure channel. For example, if a first packet for a new flow, which is not registered in a flow table, is received, the received first packet may be forwarded to the controller 602, making it possible to determine whether the packet is registered in the flow table.

3—The received packet may be discarded. For example, the received packet may be discarded in order to block Denial of Service (DoS) attacks from the outside, or to alleviate the discovery traffic incoming from the host.

Currently, the packet path is determined by the routing protocol, so it is difficult for the user to forward the packet through the desired path. On the other hand, in the OpenFlow structure, one controller 602 controls the packet path by controlling and managing multiple OpenFlow switches 601 in a centralized way. Therefore, the user easily controls the packet path based on the network status and QoS policies.

In the embodiments of the present invention described below, the SDN structure is disclosed, in which a plurality of flow tables classified (or separated) per operator are provided in a network equipment, such as an OpenFlow switch, that is controlled by a controller in a centralized way. By establishing an independent packet processing operation policy per operator or per packet flow based on the SDN structure according to an embodiment of the present invention, it is possible to establish various packet processing operation policies that cannot be achieved in the conventional packet forwarding scheme.

Figure 6:
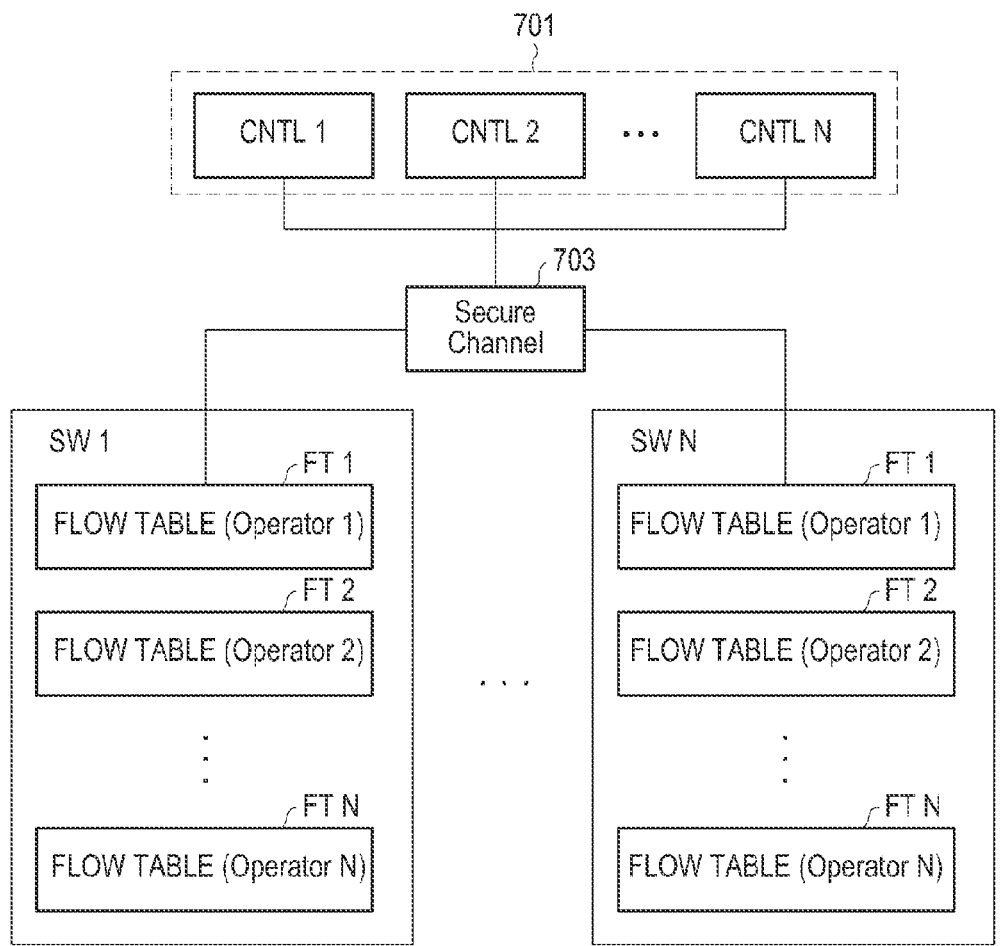
FIG. 6 illustrates the entire system for sharing SDN-based network resources according to an embodiment of the present invention.

FIG. 6 illustrates the entire system for sharing SDN-based network resources according to an embodiment of the present invention.

Referring to FIG. 6, the system according to an embodiment of the present invention includes an integrated controller 701, and a plurality of network equipments SW_1 to SW_N (where N is an integer greater than or equal to 1) that exchange information with the integrated controller 701 through a secure channel 703. Although not illustrated in FIG. 6, each of the integrated controller 701 and the plurality of network equipments may include a configuring unit for configuring data and a transceiver for transmitting and receiving data, to perform the following operations.

In this embodiment, each of the network equipments is assumed to be a switch, and the network equipments will be referred to herein as switches SW_1 to SW_N. It will be apparent to those of ordinary skill in the art that the present invention may be applied not only to the switches, but also to any type of equipment that is involved in forwarding packets in the network, such as mobile communication base stations, base station controllers, gateway equipments, and wired network switches or routers.

The integrated controller 701 may collectively manage the plurality of switches SW_1 to SW_N in a centralized way. To this end, the integrated controller 701 configures N flow tables FT_1, FT_2, . . . , FT_N by means of N controllers CNTL_1, CNTL_2, . . . , CNTL_N, respectively, and forwards the configured flow tables FT_1, FT_2, . . . , FT_N to the plurality of switches SW_1 to SW_N through the secure channel 703. The N flow tables FT_1, FT_2, . . . , FT_N may define a per-operator independent (or different) packet processing operation policy. Specifically, the first flow table FT_1 defines a packet processing operation policy for a first operator (Operator 1), and the second flow table FT_2 defines a packet processing operation policy for a second operator (Operator 2), which is independent of the packet processing operation policy for the first operator. The N-th flow table FT_N defines a packet processing operation policy for an N-th operator (Operator N), which is independent of the packet processing operation policies for the first to (N−1)-th operators (Operator 1, Operator 2 and Operator N−1). In order words, the plurality of switches SW_1 to SW_N process the packets, which are received in accordance with the per-operator different packet processing operation policies, according to the received N flow tables FT_1, FT_2, . . . , FT_N.

As such, the present invention may provide the network virtualization structure capable of processing the packets according to the per-operator independent packet processing operation policies.

While the existing network virtualization structure provides the network virtualization structure that uses a VLAN or a tunneling header such as an MPLS label, or uses information such as a virtual router ID, the present invention may provide a network virtualization structure which is completely separated (or independent of) per operator since a flow table is separated per operator. Therefore, it is possible to establish a per-operator independent network operation policy.

In Radio Access Networks (RAN) sharing for a mobile communication network, a flow table is built per a Public Land Mobile Network (PLMN) ID indicating an operator.

N controllers may be operated independently without being integrated. Alternatively, one integrated controller may operate a plurality of switches by integrating N packet processing operation policies. For example, if a mobile virtual network operator desires to set up a network of the mobile network operator, the controllers may be operated as an integrated controller.

The SDN-based packet processing operation policies according to an embodiment of the present invention are as follows.

(1) A traffic engineering policy for finding a per-flow optimized path.

(2) A proxy path provision policy based on a per-operator policy, for the packets heading to the same destination such as the same IP address, MAC address or the like.

(3) A per-operator prioritization policy for the case where the same network resources are shared.

(4) A per-operator individual security policy.

(5) A per-operator hierarchical QoS policy for the case where operators use the same interface.

The traffic engineering policy for finding a per-flow optimized path will be described in detail below.

Figure 7:
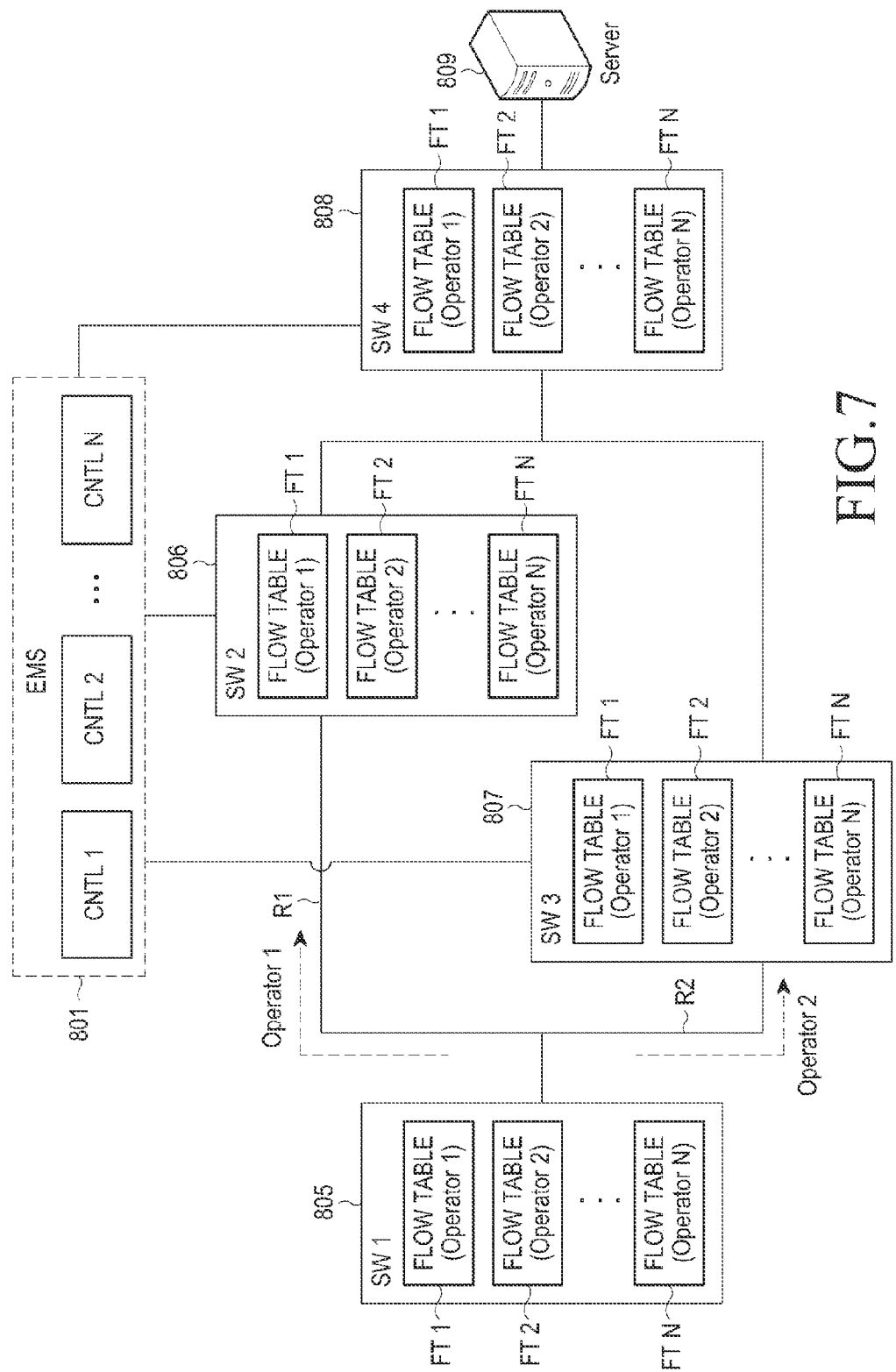
FIG. 7 illustrates a per-operator optimized traffic engineering policy by an SDN-based network sharing method according to an embodiment of the present invention.

FIG. 7 illustrates a per-operator optimized traffic engineering policy by an SDN-based network sharing method according to an embodiment of the present invention.

Referring to FIG. 7, if multiple operators share resources of first to fourth switches SW1, SW2, SW3 and SW4, a packet that is forwarded from the first switch SW1 to a specific server 809 such as a YouTube® server, undergoes an operation policy based on a flow table which is different depending on the operator ID.

Each of the per-operator controllers CNTL_1, CNTL_2, . . . , CNTL_N detects the optimal path for a packet flow per operator taking into account the conditions that meet the policy established by each operator. For example, a packet received at the first switch (SW1) 805 may be forwarded to the second switch (SW2) 806 through a first path R1 according to a first packet processing operation policy in the first flow table FT_1, or may be forwarded to the third switch (SW3) 807 via a second path R2 according to a second packet processing operation policy in the second flow table FT_2, which is independent of the first packet processing operation policy.

As to the main difference between the existing packet processing scheme and the packet processing method provided in the present invention, while the existing scheme processes traffic through the same path at all times, for the same flow, even though the network virtualization technique is applied, a method in accordance with an embodiment of the present invention processes the traffic through the per-operator optimized path by applying the per-operator different conditions and policies.

Finding the per-operator optimal path taking into account various policies as described above may be processed by a software operation in the controller provided in the OpenFlow-based SDN structure.

Therefore, each of the controllers CNTL_1, CNTL_2, . . . . , CNTL_N needs to include software for searching for the optimal path, and the processing results may be forwarded to all of the switches SW1, SW2, SW3 and SW4 by the OpenFlow protocol.

The parameters, which are considered when the aforesaid per-operator policy is applied to a received packet, are as follows.

(1) A bandwidth that is allocated to a link per operator.
(2) A priority for per-operator packet processing.
(3) Traffic statistics including utilization of the currently used link.
(4) The existence of an operator's proxy server for processing a specific type of traffic.

As described above, using the SDN-based network sharing according to an embodiment of the present invention, it is possible to support not only traffic engineering, but also various services such as per-operator independent security policy establishment, seamless handover, and the like.

One of the most important points that should be considered in the SDN-based network sharing method relates to the hierarchical QoS policy between different operators sharing the same link.

Figure 8:
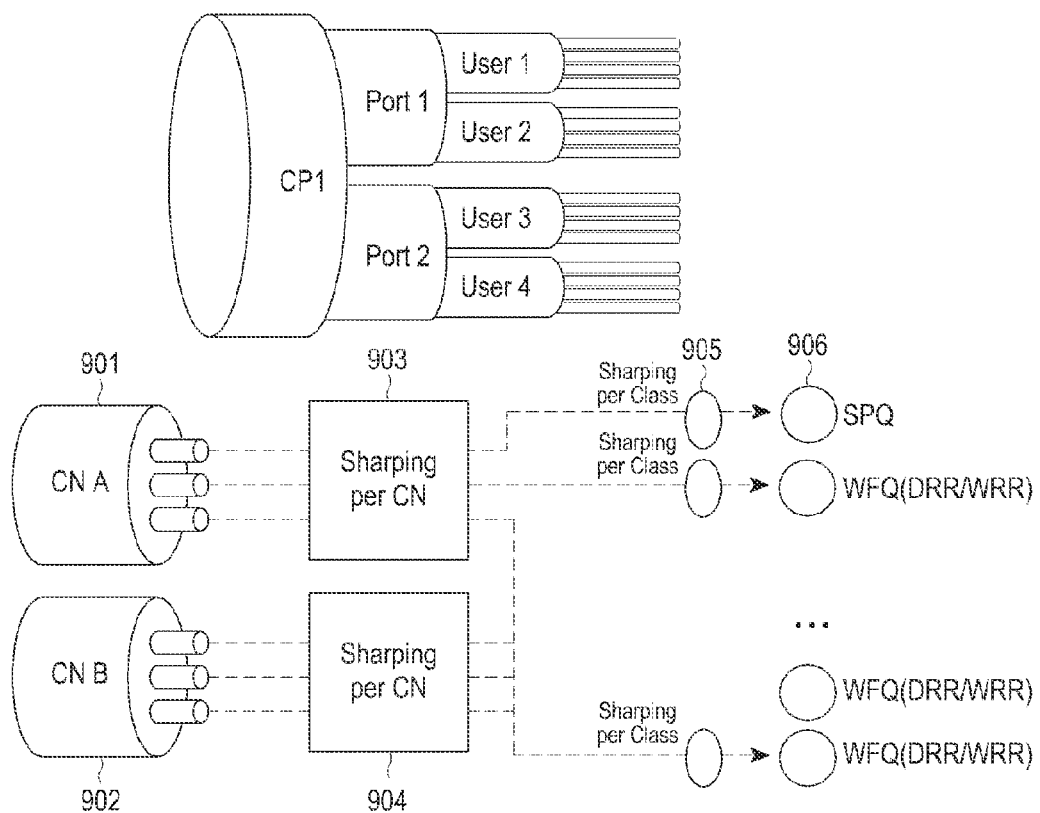
FIG. 8 illustrates Hierarchical QoS (H-QoS) provided in the present invention.

FIG. 8 illustrates Hierarchical QoS (H-QoS) provided in the present invention.

Referring to FIG. 8, the key concept for applying H-QoS to the SDN-based network sharing of the present invention is not to search for a specific field of the existing packet and apply QoS based only on the searched specific field, but to search for both an operator ID and a packet and apply hierarchical QoS based thereon.

In a case where network sharing is needed, as illustrated in FIG. 8, if first and second users User_1 and User_2 share the same physical or logical first port Port_1 and third and fourth users User_3 and User_4 share the same physical or logical second port Port_2, operator's traffic may be classified per class and the class may be classified per flow.

In the case of network sharing, there is a need for a policy for determining how to perform per-operator traffic allocation for a specific port. In addition, there is a need for per-operator/per-class or per-operator/per-flow traffic processing.

If the number of queues capable of handling the full scheduling or shaping is limited, there is a need to consider handling the full scheduling or shaping per class regardless of the number of operators. Briefly, "shaping" controls traffic by rate limiting per interface or per queue (or class). Shaping is similar with rate limiting, except that shaping buffers the packet after rate limiting operation.

In accordance with various embodiments of the present invention, ways to handle these complex requirements are provided in the following methods.

(1) Packets may be searched for (or classified) per field (e.g., flow table) corresponding to an operator ID (CN_A 901 and CN_B 902). At the same time, packets may be hierarchically searched for (or classified) per class or flow, and policing or shaping may be performed based on the search results (903 and 904). Briefly, policing is generally done for incoming traffic, and includes rate limiting and remarking of a packet based on configured policy. For example, there are two widely used standards, Single Rate Three Color Marker (SRTCM): RFC 2697, and Two Rate Three Color Marker (TRTCM): RFC 2698).

(2) If policing is needed per operator or flow, policing may be performed according to per-operator or per-flow fragmented packets.

(3) Finally, if scheduling or shaping is needed per class of each traffic regardless of the number of operators, scheduling or shaping may be applied according to the integrated per-class policy (905). Thereafter, Strict Priority Queuing (SPQ) and Weighted Fair Queuing (WFQ) are performed (906). For example, Deflect Round Robin (DRR) and Weighted Round Robin (WRR) may be used as a kind of scheduling algorithm. WRR performs scheduling based on configured weight value per queue, and configured weight in WRR is per packet based weight. DRR is an advanced scheduling algorithm which can configure weight based on packet size so it can control exact guaranteed bandwidth.

Further, SPQ may be used to configure traffic policing that prevents lower priority queues from being starved. If there is remaining traffic in a high queue, low queue traffic will not be served. SPQ can give low traffic queuing delay for high priority packet, but can make starvation for low priority queue. WFQ gives bandwidth fairness for each queue based on weight value.

As such, if the hierarchical QoS policy is performed, in which operator information and packet information are considered simultaneously, effective QoS may be performed by simultaneously applying per-operator traffic control and per-packet's class traffic control.

Figure 9:
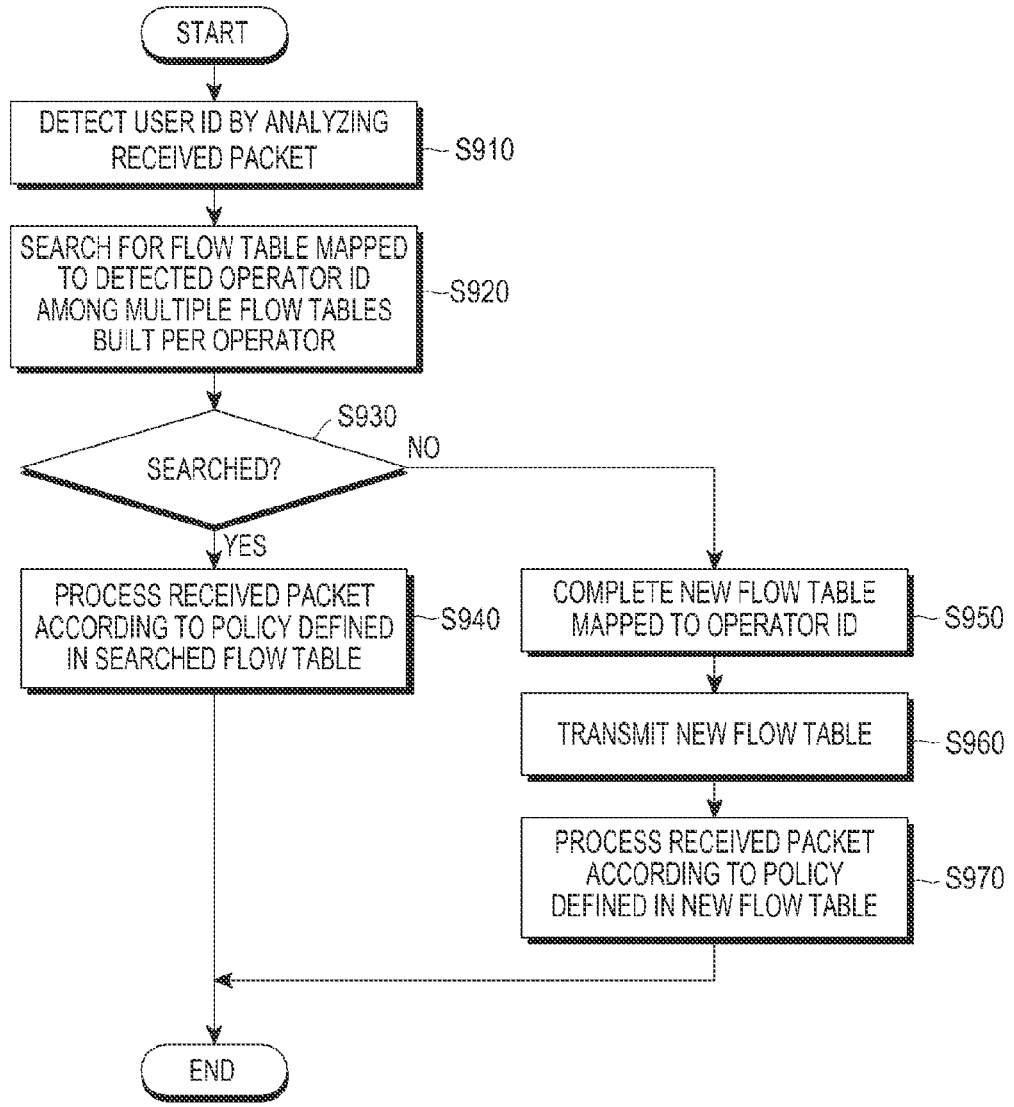
FIG. 9 is a flowchart illustrating an SDN-based network sharing method according to an embodiment of the present invention.

FIG. 9 is a flowchart illustrating an SDN-based network sharing method according to an embodiment of the present invention.

Referring to FIG. 9, a session connection process between a controller and a network equipment is first performed. If the session connection is successful, the controller transmits a plurality of flow tables in which an independent packet processing operation policy is defined per operator, to the network equipment, to build (or store) a plurality of independent packet processing operation policies per operator in the network equipment. If the plurality of independent packet processing operation policies is built, the network equipment may begin to receive packets.

In step S910, upon receiving a plurality of packets, the network equipment detects an operator ID by analyzing the plurality of received packets.

In steps S920 and S930, the network equipment searches for a flow table mapped to the operator ID detected in step S910 among the plurality of flow tables built therein.

If the flow table is searched in step S930, the network equipment forwards the plurality of received packets to the destination (or destination port) or to another network equipment provided in the optimal path to the destination according to the packet processing operation policy of the operator, which is defined in the searched flow table, in step S940.

If the flow table is not searched in step S930, the network equipment forwards the plurality of received packets to the controller through the secure channel 603 and 703 illustrated in FIGS. 4 and 6, respectively. The forwarded packet may be the first received packet among the plurality of packets which are received at the network equipment.

In step S950, the network equipment forwards the first received packet to the controller, to request a new flow table mapped to the operator ID from the controller.

In step S960, the controller configures a new flow table mapped to the operator ID according to a processing operation of software therein, and transmits the configured new flow table to the network equipment through the secure channel 603 and 703 illustrated in FIGS. 4 and 6, respectively.

In step S970, the network equipment may register the received new flow table to update a plurality of existing flow tables in which per-operator independent packet processing operation policies are defined, and forwards the plurality of received packets to the destination (or destination port) or to another network equipment provided in the optimal path to the destination according to the policy defined in the new flow table.

As is apparent from the foregoing description, according to the present invention, a controller may build a plurality of flow tables mapped to each operator in a network equipment, to efficiently support network virtualization, and each network equipment may easily implement network sharing with fewer hardware resources in conjunction with the controller.

As a controller builds a plurality of flow tables mapped to each operator in a network equipment, a plurality of users may easily set up the complex wired network or mobile communication network, and configuration information by the plurality of users, which is set in the controller, may be easily forwarded to the network equipment through the standardized protocol.

A controller may control all network equipments in the operator, making it possible to operate all the network equipments easily, consistently and transparently.

When multiple operators operate the same network resources, the optimized path for which a variety of information of a shared network of the entire network is taken into consideration may be determined by the centralized controller, and may be easily sent to notify all equipments using the standardized method.

Most complex operations are performed not by the control plane of each equipment, but by software in the controller. Therefore, each of the equipments (e.g., switches) sharing the resources connected to the controller may be simply implemented since the complex control function is not needed.

Each operator may enable control of the network per packet flow, making it possible to establish various policies compared to the existing packet forwarding scheme, and to provide switching, routing, security, QoS and the like based on the packet flow according to the established policies.

With the use of the simple standard network virtualization technique, a variety of policies may be easily applied in various ways by a per-operator flow table existing in a controller without consumption of a lot of software and hardware resources.

By providing H-QoS per operator and flow which competes for the same network resources, it is possible to easily and effectively provide the complex QoS-related processing which should be considered when multiple operators share the same network.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for performing Software Defined Network (SDN)-based network sharing by a controller to support multiple operators, the method comprising:
   configuring a plurality of flow tables in which an independent packet processing operation policy is defined per operator, wherein the per-operator independent packet processing operation policy is a policy for searching for an optimized path for a packet flow per operator according to at least one of a bandwidth allocated to a link per operator, priority of per-operator packet processing, traffic statistics related to utilization of a currently used link, and existence of an operator's proxy server; and
   transmitting the plurality of configured flow tables to a network equipment, to establish an independent packet processing operation policy per operator in the network equipment,
   wherein the plurality of configured flow tables are configured to not be connected to each other in the network equipment.

2. The method of claim 1, wherein configuring the plurality of flow tables comprises configuring the plurality of flow tables including a first flow table in which a packet processing operation policy of a first operator is defined, and a second flow table in which a packet processing operation policy of a second operator is defined.

3. The method of claim 2, wherein establishing the independent packet processing operation policy per operator comprises transmitting the first and second flow tables to the network equipment, to establish an independent packet processing operation policy per each of the first operator and the second operator in the network equipment.

4. The method of claim 1, wherein establishing the independent packet processing operation policy per operator comprises transmitting the plurality of configured flow tables, in which an independent packet processing operation policy is defined per operator, to the network equipment using an OpenFlow protocol.

5. The method of claim 1, wherein the per-operator independent packet processing operation policy includes:
   a policy for providing a proxy path for a packet that moves to a same destination including a same Internet Protocol (IP) address or Media Access Control (MAC) address according to a per-operator policy; and
   a policy for giving different priority to each operator for same network resources, if multiple operators share the same network resources.

6. The method of claim 1, wherein the per-operator independent packet processing operation policy is a per-operator Hierarchical Quality of Service (H-QoS) policy if multiple operators share a same network equipment.

7. The method of claim 6, wherein the per-operator H-QoS policy is a policy in which per-operator traffic processing for the packet and per-class traffic processing for the packet are simultaneously taken into account.

8. The method of claim 6, wherein the per-operator H-QoS policy is a policy in which per-operator traffic processing for the packet and per-flow traffic processing for the packet are simultaneously taken into account.

9. The method of claim 1, wherein configuring the plurality of flow tables comprises transmitting the plurality of flow tables to all other network equipments which are connected to the network equipment directly or indirectly.

10. A method for performing Software Defined Network (SDN)-based network sharing by a network equipment to support multiple operators, the method comprising:
receiving a plurality of flow tables, in which an independent packet processing operation policy is defined per operator, from a controller, wherein the per-operator independent packet processing operation policy is a policy for searching for an optimized path for a packet flow per operator according to at least one of a bandwidth allocated to a link per operator, priority of per-operator packet processing, traffic statistics related to utilization of a currently used link, and existence of an operator's proxy server; and
establishing an independent packet processing operation policy per operator according to the plurality of received flow tables,
wherein the plurality of flow tables are not connected to each other in the network equipment.

11. The method of claim 10, wherein receiving the plurality of flow tables comprises receiving the plurality of flow tables according to an OpenFlow protocol.

12. The method of claim 10, wherein the per-operator independent packet processing operation policy includes:
a policy for providing a proxy path for a packet that moves to a same destination including a same Internet Protocol (IP) address or Media Access Control (MAC) address according to a per-operator policy; and
a policy for giving different priority to each operator for same network resources, if multiple operators share the same network resources.

13. The method of claim 10, wherein the per-operator independent packet processing operation policy is a per-operator Hierarchical Quality of Service (H-QoS) policy.

14. The method of claim 13, wherein the per-operator H-QoS policy is a policy in which per-operator traffic processing for the packet and per-class traffic processing for the packet are simultaneously taken into account.

15. The method of claim 13, wherein the per-operator H-QoS policy is a policy in which per-operator traffic processing for the packet and per-flow traffic processing for the packet are simultaneously taken into account.

16. An apparatus for performing Software Defined Network (SDN)-based network sharing by a controller to support multiple operators, the apparatus comprising:
a configuring unit for configuring a plurality of flow tables in which an independent packet processing operation policy is defined per operator, wherein the per-operator independent packet processing operation policy is a policy for searching for an optimized path for a packet flow per operator according to at least one of a bandwidth allocated to a link per operator, priority of per-operator packet processing, traffic statistics related to utilization of a currently used link, and existence of an operator's proxy server; and
a transmitter for transmitting the plurality of configured flow tables to a network equipment, to establish an independent packet processing operation policy per operator in the network equipment,
wherein the plurality of configured flow tables are configured to not be connected to each other in the network equipment.

17. The apparatus of claim 16, wherein the configuring unit configures the plurality of flow tables including a first flow table in which a packet processing operation policy of a first operator is defined, and a second flow table in which a packet processing operation policy of a second operator is defined.

18. The apparatus of claim 17, wherein the transmitter transmits the first and second flow tables to the network equipment, to establish an independent packet processing operation policy per each of the first operator and the second operator in the network equipment.

19. The apparatus of claim 16, wherein the transmitter transmits the plurality of configured flow tables, in which an independent packet processing operation policy is defined per operator, to the network equipment using an OpenFlow protocol.

20. The apparatus of claim 16, wherein the per-operator independent packet processing operation policy includes:
a policy for providing a proxy path for a packet that moves to a same destination including a same Internet Protocol (IP) address or Media Access Control (MAC) address according to a per-operator policy; and
a policy for giving different priority to each operator for same network resources, if multiple operators share the same network resources.

21. The apparatus of claim 16, wherein the per-operator independent packet processing operation policy is a per-operator Hierarchical Quality of Service (H-QoS) policy if multiple operators share a same network equipment.

22. The apparatus of claim 21, wherein the per-operator H-QoS policy is a policy in which per-operator traffic processing for the packet and per-class traffic processing for the packet are simultaneously taken into account.

23. The apparatus of claim 21, wherein the per-operator H-QoS policy is a policy in which per-operator traffic processing for the packet and per-flow traffic processing for the packet are simultaneously taken into account.

24. The apparatus of claim 16, wherein the transmitter transmits the plurality of configured flow tables to all other network equipments which are connected to the network equipment directly or indirectly.

25. An apparatus for performing Software Defined Network (SDN)-based network sharing by a network equipment to support multiple operators, the apparatus comprising:
a receiver for receiving a plurality of flow tables, in which an independent packet processing operation policy is defined per operator, from a controller, wherein the per-operator independent packet processing operation policy is a policy for searching for an optimized path for a packet flow per operator according to at least one of a bandwidth allocated to a link per operator, priority of per-operator packet processing, traffic statistics related to utilization of a currently used link, and existence of an operator's proxy server, for a packet received by the network equipment; and
a configuring unit for establishing an independent packet processing operation policy per operator according to the plurality of received flow tables,
wherein the plurality of flow tables are not connected to each other in the network equipment.

26. The apparatus of claim 25, wherein the receiver receives the plurality of flow tables according to an OpenFlow protocol.

27. The apparatus of claim 25, wherein the per-operator independent packet processing operation policy includes:
a policy for providing a proxy path for a packet that moves to a same destination including a same Internet Protocol (IP) address or Media Access Control (MAC) address according to a per-operator policy; and a policy for giving different priority to each operator for same network resources, if multiple operators share the same network resources.

28. The apparatus of claim 25, wherein the per-operator independent packet processing operation policy is a per-operator Hierarchical Quality of Service (H-QoS) policy.

29. The apparatus of claim 28, wherein the per-operator H-QoS policy is a policy in which per-operator traffic processing for the packet and per-class traffic processing for the packet are simultaneously taken into account.

30. The apparatus of claim 28, wherein the per-operator H-QoS policy is a policy in which per-operator traffic processing for the packet and per-flow traffic processing for the packet are simultaneously taken into account.

* * * * *